United States Patent
Madsak et al.

(10) Patent No.: US 6,750,417 B2
(45) Date of Patent: Jun. 15, 2004

(54) STUD WELDING HEAD

(75) Inventors: Jürgen Madsak, Breckerfeld (DE); Ulrich Citrich, Gevelsberg (DE)

(73) Assignee: Nelson Bolzenschweiss Technik GmbH & Co. KG, Gevelsberg (DE)

( * ) Notice: Subject to any disclaimer, the term of this patent is extended or adjusted under 35 U.S.C. 154(b) by 0 days.

(21) Appl. No.: 10/204,119

(22) PCT Filed: Feb. 21, 2001

(86) PCT No.: PCT/DE01/00683
§ 371 (c)(1), (2), (4) Date: Nov. 5, 2002

(87) PCT Pub. No.: WO01/62427
PCT Pub. Date: Aug. 30, 2001

(65) Prior Publication Data
US 2003/0132202 A1 Jul. 17, 2003

(30) Foreign Application Priority Data
Feb. 21, 2000 (DE) ................................. 200 03 132 U

(51) Int. Cl.⁷ ................................................ B25K 9/20
(52) U.S. Cl. ...................................................... 219/98
(58) Field of Search ...................................... 219/98, 99

(56) References Cited

U.S. PATENT DOCUMENTS

| 5,070,226 | A | * | 12/1991 | Raycher et al. | 219/98 |
| 5,252,802 | A | * | 10/1993 | Raycher | 219/98 |
| 5,406,044 | A | * | 4/1995 | Killian et al. | 219/98 |
| 5,502,291 | A | * | 3/1996 | Cummings | 219/98 |
| 5,938,945 | A | * | 8/1999 | Hofmann et al. | 219/99 |
| 5,977,506 | A |   | 11/1999 | von Däniken | 219/99 |
| 6,215,085 | B1 | * | 4/2001 | Cummings et al. | 219/98 |

FOREIGN PATENT DOCUMENTS

DE 4314528 11/1994

* cited by examiner

Primary Examiner—Clifford C. Shaw
(74) Attorney, Agent, or Firm—Howard & Howard

(57) ABSTRACT

The invention relates to a stud welding head with a linear drive (5), a welding pin (11) coupled with said linear drive (5), and a length metering system (7) that determines the position of the welding pin (11) in the stud welding head, said length metering system (7) being an electromagnetic length metering system.

14 Claims, 1 Drawing Sheet

STUD WELDING HEAD

RELATED APPLICATIONS

Figure 2:
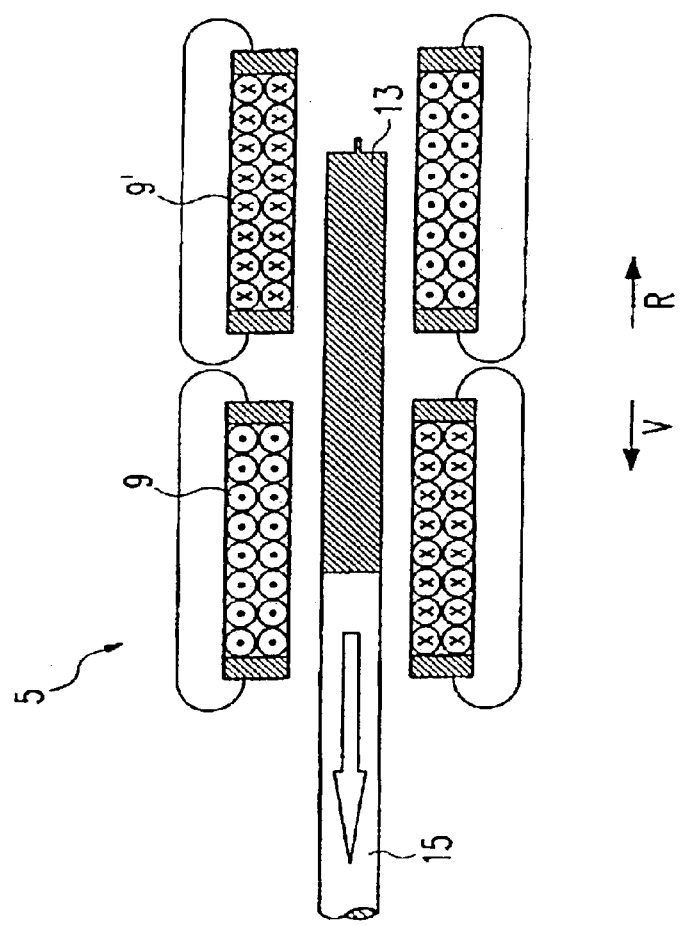

This application is a National Stage application of PCT/DE01/00683, filed Feb. 21, 2001, which was not published in English under PCT Article 21(2). The present application claims priority under 35 U.S.C. §119 of German Application No. 20003132.5, filed Feb. 21, 2000.

The invention concerns a stud welding head with a linear drive, a welding pin coupled with the linear drive, and a length measuring system that determines the position of the welding pin in the stud welding head.

Stud welding devices are, for example, used in the automobile industry to weld studs to the body of a car. The welding occurs in that a high voltage is applied between the studs secured in the welding head and the work piece and in that an electric arc is created. The positioning of the welding stud, namely the lifting of the welding stud and the creation of the electric arc as well as the subsequent dipping of the stud into the welding deposit should ensure that a consistently high weld quality is always achieved. Until now, only optoelectronic length- or distance-measuring systems have been used. These are sensitive with respect to the high welding currents and the corresponding magnetic fields. Strong magnetic fields can be created in stud welding heads also in the area of the linear drive, since the linear drives often operate according to the moving coil principle, i.e., they have current-carrying coils and permanent magnets. The optoelectronic length measuring systems are, however, temperamental with respect to dirt. Since a large number of welding jets are created in the area of the welding head and the environment is often very dusty, the previously used optoelectronic distance measuring systems are sealed in the welding head, which requires a lot of work.

The invention establishes a stud welding head, which is distinguished by its simple construction, and the length measuring system of which offers an even better resolution than the previously used length measuring system.

This is achieved for a stud welding head of the type named above in that the length measuring system is an electromagnetic length measuring system.

Practical experience has shown that electromagnetic length measuring systems, which are sensitive to dirt out of principle, are able to function in stud welding heads. This is completely surprising for an expert, since extremely high welding currents flow in the stud welding heads and, as a result, strong electromagnetic fields are created. As it turns out, resolutions, which are much higher than those in optoelectronic length measuring systems, can also be achieved in welding heads by electromagnetic length measuring systems.

In accordance with the preferred design, an incremental length measuring system with a magnetic band and a magnetic sensor is used, whereby the magnetic band is affixed to the welding pin. Due to the provision of a magnetic band, the effort required to fasten the band to the welding pin is low.

Moreover, the length measuring system can have an adjustable resolution in order to be able to adjust it based on conditions and requirements.

Alternatively, an inductive length measuring system is also used.

The preferred design uses a linear drive that functions according to the moving coil principle and has several series-connected coils, into which at least one permanent magnet extends, which is coupled with the welding pin. This type of linear drive has the advantage that it can achieve an exact positioning of the welding pin and is ideally supplemented with the electromagnetic length measuring system, which has a high resolution. Since this type of linear drive also creates extremely strong magnetic fields, it is all the more astonishing that an electromagnetic length or distance measuring system, in particular with the use of a magnetic band and an inductive magnetic sensor, functions highly accurately and is also stable in the long-term.

Additional characteristics and advantages of the invention ensue from the following description and from the following drawing, to which reference is made.

Figure 1:
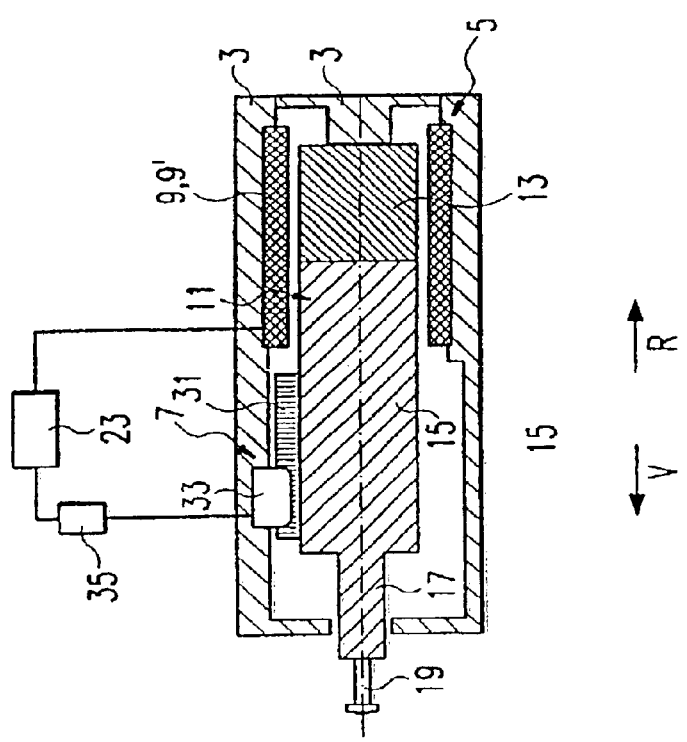

FIG. 1 shows a longitudinal-section view through the stud welding head in accordance with the invention; and FIG. 2 shows a schematic diagram of the linear drive of the stud welding head in accordance with FIG. 1.

In FIG. 1, a stud welding head is portrayed that has a housing 3; an electromagnetic, axial-operative linear drive 5 located in housing 3; and an electromagnetic length or distance measuring system 7. The linear drive 5 consists of several cylindrical coils 9, 9' (see FIG. 2) that are affixed to housing 3 and a welding pin 11 that extends into the interior of coils 9, 9' but that also projects from them. The welding pin 11, on the other hand, consists of several sections, namely a rear section 13 in the form of one or more successively arranged permanent magnets and a connected, stretched-out cylindrical section 15, which has a front end that is designed as a stud holder. A stud 19 to be welded is inserted and secured in the stud holder 17.

The stud welding head displayed in FIG. 1 works as follows:

The stud welding head is applied to a non-portrayed work piece, for example, a vehicle sheet metal. During the application of the welding head, which is affixed to a robot arm, the welding pin 11 can be in the starting position shown in FIG. 1. When the robot has affixed the welding head to the work piece, the welding pin 11 is moved in the advance direction V, until the tip of the welding stud 19 comes in contact with the surface of the work piece. In this position, the location of the work piece can be determined.

After the work-piece surface has been contacted, the welding voltage is applied and the drive pin 11 proceeds in a distance- or velocity-driven manner in a defined route in direction R to a desired or interim position so that the electric arc is generated by means of stroke firing. In order to obtain high-quality standards during welding, it is necessary that the distance between the work piece and the welding stud is kept as constant as possible, which is easy to achieve by means of the high-resolution, incremental length measuring system in combination with the special linear drive 5. For this reason, linear drive 5 and the length measuring system are described below in more detail.

The linear drive 5, which functions in accordance with the moving coil principle, can have, as shown in FIG. 2, several coils, for example two coils 9, 9' connected in a row with different winding directions, so that two electromagnets with opposite magnetic flow directions are created, as described, for example, in U.S. Pat. No. 5,321,226. The permanent magnet on rear section 13 projects into both coils 9, 9' and can be moved in both directions through coils 9, 9'.

The length measuring system 7 is there to determine the location of the drive pin 11 and is connected with a control module 23, which, on the other hand, also controls the welding current and coils 9, 9'.

The electromagnetic length measuring system 7 consists of a magnetic band 31, which is affixed to welding pin 11, for example using glue, and a magnetic sensor 33 affixed to housing 3. The resolution of the length measuring system can be set, for example in the range from 1 mm to 0.005 mm, via a rotating coding circuit 35.

The magnetic band 31 includes a number of linearly arranged permanent magnets, for example in the form of bar magnets that are arranged with their axis diagonal to the longitudinal axis of the magnetic band. The permanent magnets can be embedded or injected into plastic. If necessary, the magnetic band can be strengthened with metal strips or wires. The permanent magnets are preferably located equidistant from each other in the longitudinal direction of magnetic band 31. For example, the distance between two permanent magnets can be approx. 2 mm.

The magnetic sensor (i.e., any type of sensor for the detection of magnetic fields) can be designed as an inductive sensor. If magnetic sensors 33 and magnetic band 31 are moved relative to each other, then the magnetic sensor creates an undulating signal. The signal is evaluated by an evaluation unit (not portrayed here) that, for example, can be integrated into control module 23, and, from this, the change in the position or the absolute position of the welding pin 11 is determined. For example, the signal of the magnetic sensor can be scanned equidistantly, and the position of the welding pin can be determined extremely accurately from the information on the distance between two extremes of the signal, which correlates with the distance between two permanent magnets in the longitudinal direction of the magnetic band, and from the signal value in the scanning point, in reference to a peak value.

If drive pin 11 is finally moved in advance direction V by activation of linear drive 5, this movement preferably occurs regularly (close loop feedback). Stud 19 is dipped into the melt and affixed to the work piece. Of course, a controlled movement without regulation would also be possible.

What is claimed is:

1. A stud welding head, comprising;

a linear drive, a welding pin coupled with said linear drive, and a length measuring system for determining a position of said welding pin, wherein said length measuring system includes an electromagnetic length measuring system having a magnetic element affixed to said welding pin for generating a signal representative of a location of said welding pin.

2. A stud welding head in accordance with claim 1 wherein said length measuring system is further defined as an incremental length measuring system.

3. A stud welding head in accordance with claim 2 wherein said length measuring system includes a plurality of permanent magnets arranged linearly in a movement direction of said welding pin and a magnetic sensor proximate said plurality of permanent magnets.

4. A stud welding head in accordance with claim 3 wherein said permanent magnets are provided on or in a band and form a magnetic band.

5. A stud welding head in accordance with claim 4 wherein said permanent magnets or said magnetic band are affixed to said welding pin.

6. A stud welding head in accordance with claim 5 wherein said length measuring system includes an adjustable resolution.

7. A stud welding head in accordance with claim 6 wherein said linear drive includes a plurality of series-connected coils and operates in accordance with the moving coil principle.

8. A stud welding head in accordance with claim 7 further including a permanent magnet coupled to said welding pin wherein said permanent magnet extends into said series-connected coils.

9. A stud welding head, comprising;

a linear drive, a welding pin coupled with said linear drive, and a length measuring system for determining a position of said welding pin, wherein said length measuring system includes an electromagnetic length measuring system having a plurality of permanent magnets arranged linearly in a movement direction of said welding pin for generating an incremental signal and a magnetic sensor proximate said plurality of permanent magnets for receiving said incremental signal.

10. A stud welding head in accordance with claim 9 wherein said permanent magnets are provided on or in a band and form a magnetic band.

11. A stud welding head in accordance with claim 10 wherein said permanent magnets or said magnetic band are affixed to said welding pin.

12. A stud welding head in accordance with claim 9 wherein said length measuring system includes an adjustable resolution.

13. A stud welding head in accordance with claim 9 wherein said linear drive includes a plurality of series-connected coils and operates in accordance with the moving coil principle.

14. A stud welding head in accordance with claim 9 further including a permanent magnet coupled to said welding pin wherein said permanent magnet extends into said series-connected coils.

* * * * *